United States Patent [19]
Ju

[11] Patent Number: 6,039,413
[45] Date of Patent: Mar. 21, 2000

[54] COMPACT DISK BOX CAPABLE OF AUTOMATICALLY EXTENDING AND RETRACTING COMPACT DISKS

[76] Inventor: Ted Ju, No. 15, Wu Shiunn St., An Leh District, Keelung City, Taiwan

[21] Appl. No.: 09/281,444

[22] Filed: Mar. 30, 1999

[51] Int. Cl.[7] ................................................. A47B 63/06
[52] U.S. Cl. ...................... 312/9.15; 312/9.11; 312/9.16; 211/40
[58] Field of Search .................................... 312/9.9, 9.11, 312/9.12, 9.15, 9.16, 9.18, 327, 328; 211/40, 41.12

[56] References Cited

U.S. PATENT DOCUMENTS

| | | | |
|---|---|---|---|
| 1,004,281 | 9/1911 | Kuhn | 211/40 |
| 4,664,454 | 5/1984 | Schatteman et al. | 312/12 |
| 5,683,153 | 11/1997 | Ohta | 312/9.1 |

*Primary Examiner*—Janet M. Wilkens
*Assistant Examiner*—Michael J. Fisher
*Attorney, Agent, or Firm*—Bacon & Thomas, PLLC

[57] ABSTRACT

A compact disk box structure that can automatically push out compact disks in a preset sequence and then return them to original positions. The box primarily comprises a box body, a push plate, a front lid, a plurality of push rods, and a back lid and is completed with a switch mechanism. The box body is provided with slide guide grooves on two opposite sides of the top face, a row of parallel elongated openings on the rear portion of the top face, a plurality of partition ribs each separately formed on the inner wall surface of the top and the bottom of the box body, and a plurality of push rods seated between adjacent partition ribs by means an axle rod and extending through the openings on the top face.

7 Claims, 5 Drawing Sheets

COMPACT DISK BOX CAPABLE OF AUTOMATICALLY EXTENDING AND RETRACTING COMPACT DISKS

BACKGROUND OF THE INVENTION (a) Field of the Invention

The present invention relates to a compact disk box that can extend and retract compact disks disposed therein, especially to a compact disk box that can automatically push outward compact disks (CD) for user's viewing and that can make the compact disks return to their positions after viewing. It has a compact and simple construction and is valuable in the industry.

(b) Description of the Prior Art

A prior art compact disk box has typically an open structure for housing compact disks. Although prior art compact disk boxes have many variations in outer appearance and form, they can only provide arrangement and storage functions. Typical examples are U.S. Pat. Nos. 4,697,704 and 5,178,284. These CD box structures have no means to draw out compact disks. Thus when users want to pick out a compact disk they have to take these compact disks out of boxes. It brings inconvenience to users.

SUMMARY OF THE INVENTION

Accordingly, it is the primary object of the invention to provide a compact disk box structure that can automatically push out compact disks in sequence and then return them to original positions. The compact disk box structure is provided with a plurality of partition ribs spaced and arranged on the interior surfaces of the top and the bottom wall to form rooms for receiving a compact disk in each pair of adjacent ribs. The box structure is further provided with a push plate that can move compact disks outwards and allows the compact disks automatically to go back to the interior of the box and so the box structure of the invention can provide the convenience in viewing and picking compact disks.

It is another object of the present invention to provide a compact disk box structure that has a front end closed by a front lid and of which the front lid can be secured in position by means of a switch disposed on the bottom face of a push plate at the front edge to keep the box from the invasion of dust.

It is a further object of the present invention to provide a compact disk box structure in which users can progressively move the compact disks and when moving the push plate users can sense the moving speed of compact disks by means of a ratchet bar and clicks caused by a stopper block striking against the ratchet bar.

DETAILED DESCRIPTION OF THE PREFERRED EMBODIMENT

Figure 1:
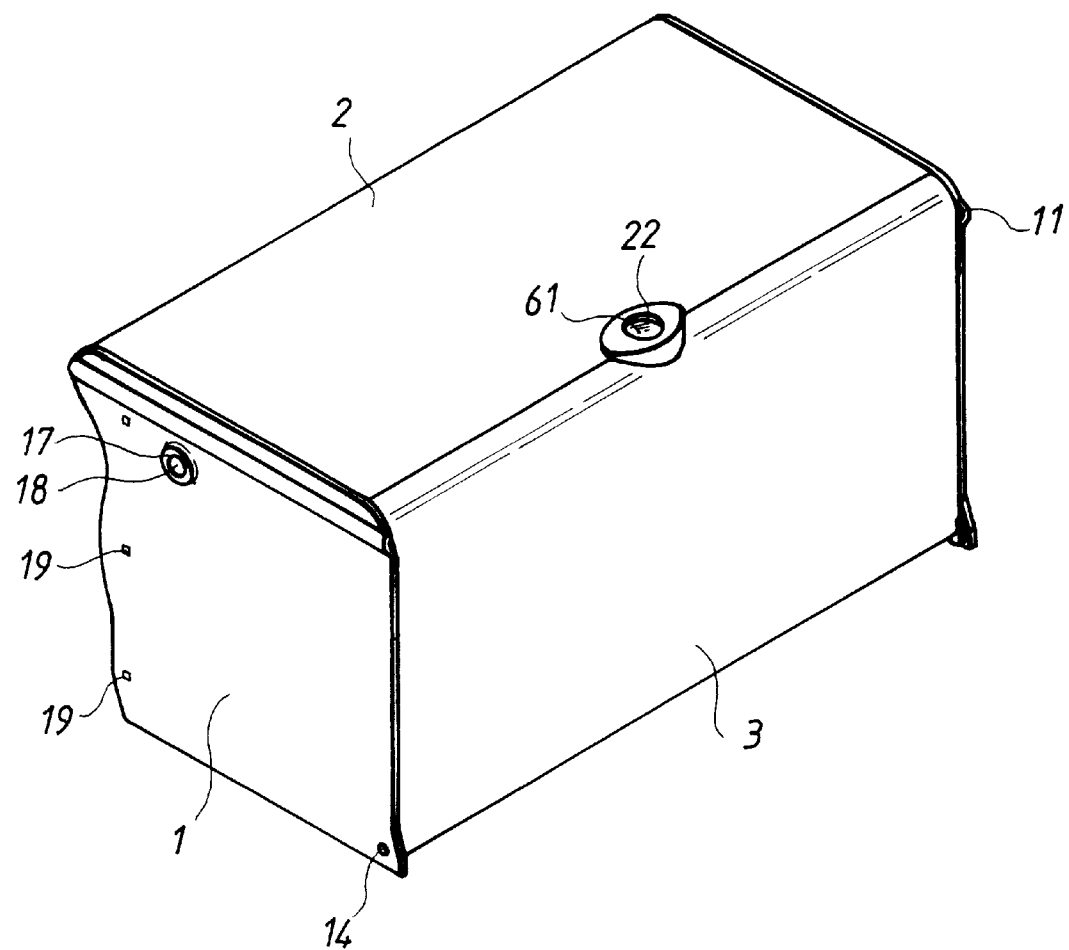
FIG. 1 is a perspective view of a compact disk box according to the present invention.
Figure 2:
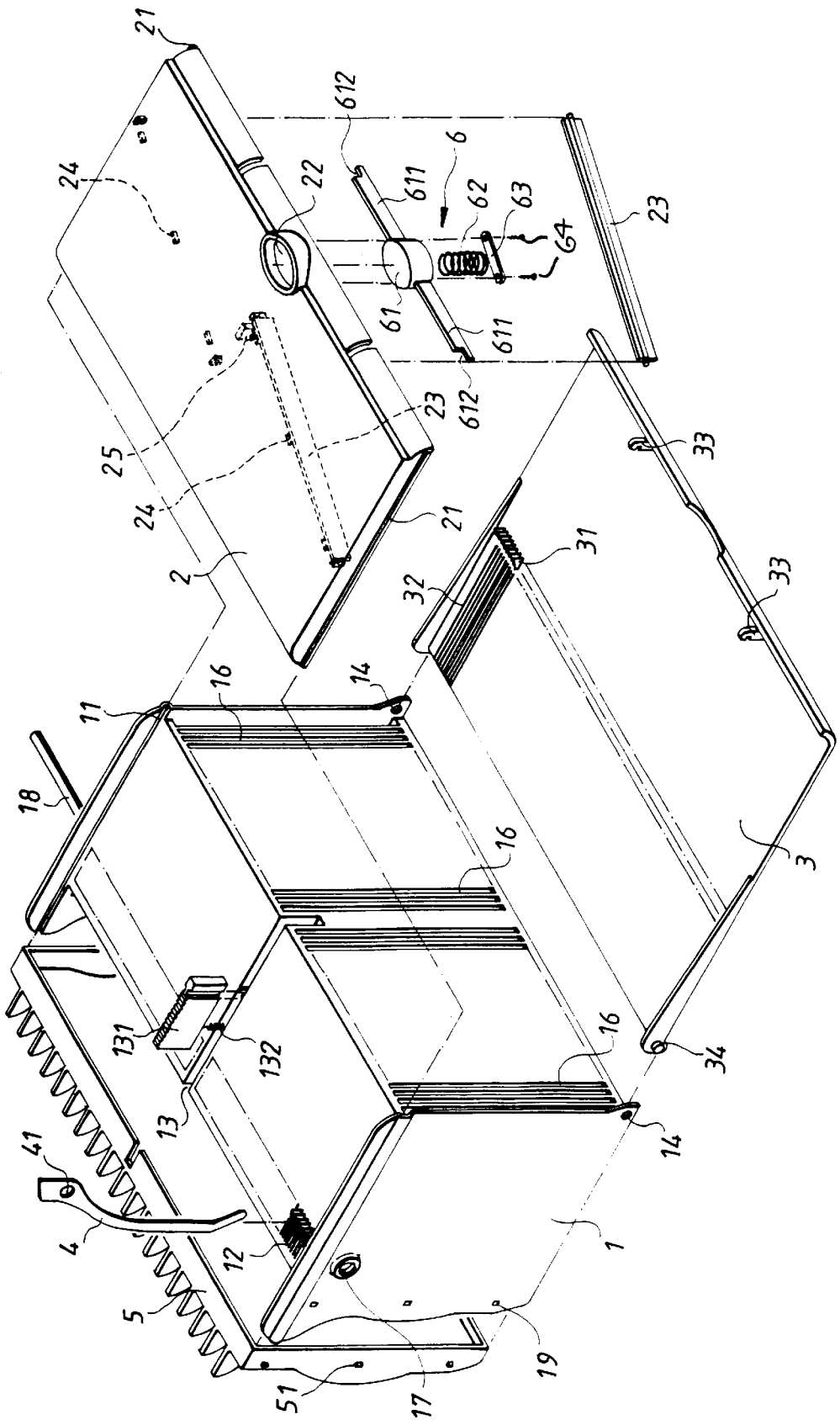
FIG. 2 is an exploded view of the compact disk box of FIG. 1.

As shown in FIGS. 1 and 2, the invention is a compact disk box structure that can automatically push out compact disks in sequence and then return them to original positions. The box structure mainly comprises a box body 1, a push plate 2, a front lid 3, a plurality of push rods 4, and a back lid 5 and is completed with a switch mechanism 6.

The box body 1 is open on the real end and is provided with slide guide grooves 11 on two opposite sides of the top face thereof, a row of parallel elongated openings 12 on the rear portion of the top face, a longitudinal groove 13 on the central portion of the top face and extending from the front end to the real end. In the longitudinal groove 13 is provided with a ratchet bar 131 that has a toothed top surface, and a resilient element 132 on the bottom of the ratchet bar 131. The box body 1 is further provided with a pin hole 14 on the lower portion of two side walls of the box body 1 near the front end, a row of partition ribs 15 each separately formed on the inner wall surface of the top and the bottom of the box body, a row of long slots 16 disposed on the front wall, two axle holes 17 individually formed on two side walls near the elongated slots 12 to allow an axle rod 18 to pass through, and a plurality of cavities 19 arranged on two side walls behind the axle hole 17.

The push plate 2 has a plate-like body with a guide bar 21 arranged on two sides thereof. The guide bar is designed to engage with the slide guide grooves 11 of the box body 1. The push plate 2 is further equipped with a push button hole 22 at the center of the front edge, one or more sets of one-way stoppers 23 transversely disposed on the central portion of the bottom face, a plurality of protrusions 24 and a detent block 25 integrated with the bottom face.

The front lid 3 is provided on the inner wall surface with a transverse row of tabs 31 at a proper position, a plurality of rails 32 under the tabs 31 two hook-shaped tabs 33 respectively near the two ends of the front edge of the inner wall, two short pins 34 individually arranged on the outer walls near two ends of the lower edge for engagement with pin holes 14 of the box body 1.

The push rod 4 has a curved rod body with an axle hole on the upper end thereof.

The back lid 5 is a cover sized for the opening on the backside of the box body 1 and is provided with a plurality of embossed dots 51 on two side walls at positions corresponding to the cavities of the box body 1 so that the back lid 5 can be held in position by means of the engagement of the embossed dots 51 with the cavities.

Figure 3:
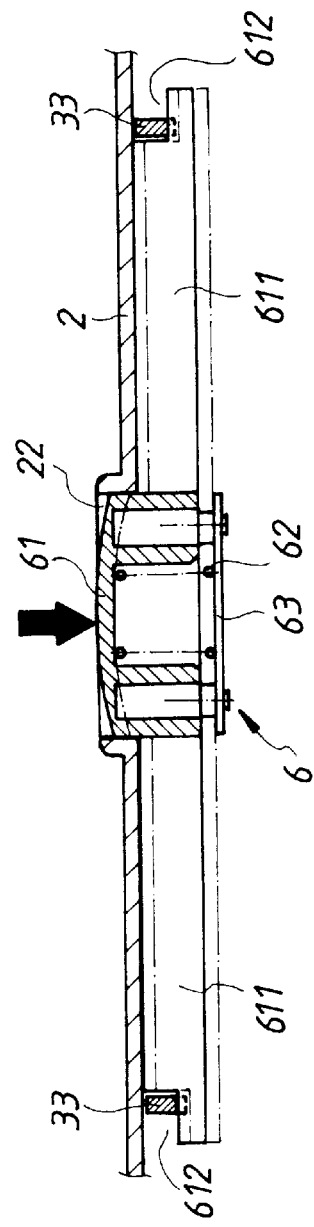
FIG. 3 is a partial cross sectional view of the compact disk box.
Figure 4:
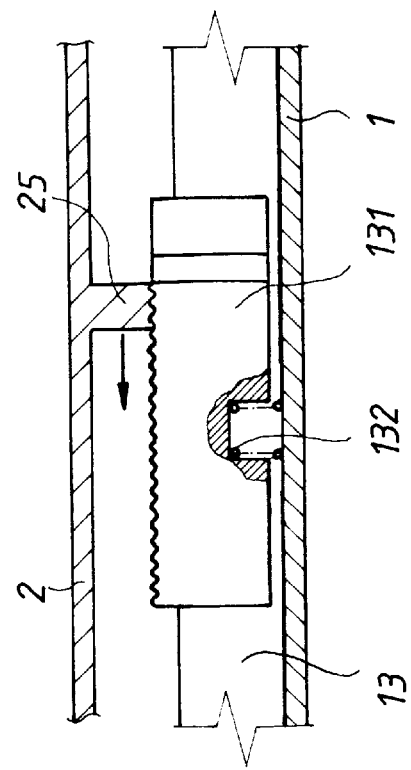
FIG. 4 is a cross sectional view schematically illustrating the operation of the switch of the invention.

The switch mechanism 6, shown in FIGS. 3 and 4, has a push button 61 sized to fit for the push button hole 22, a resilient element 62, and a retaining plate 63. The push button 61 is configured to have a wing 611 on two sides thereof, which wing 611 is provided with a notch 612 on the outermost end. The resilient element 62 is disposed on the bottom of the push button 61 and then the push button 61 along with the resilient element 62 is kept inside the push button hole 22 by the retaining plate 63 and screws 64. When the front lid 3 closes the front end of the box body 1, the hook-shaped tabs 33 snap on the notches 612 of wings 611 to keep the front lid 3 in position.

With the above arrangement, a plurality of push rods 4 are placed in sequence into the elongated openings 12 on the top face of the box body 1. Then the axle rod 18 is inserted into the axle hole 17 on one side wall and further extends through the axle hole 41 of each push rod 4 to the axle hole 17 on the opposite side wall. As a consequence, each push rod 4 rotatably sits between two adjacent ribs 155 of the box body 1. Furthermore the front lid 3 is pivoted at the pin hole 14 of the box body 1 so that it can be opened and closed with ease by means of the switch mechanism 6. Finally the back lid 5 is attached to the box body 1 to close the real end of the box. In this way the compact disk box is built according to the invention.

Figure 5:
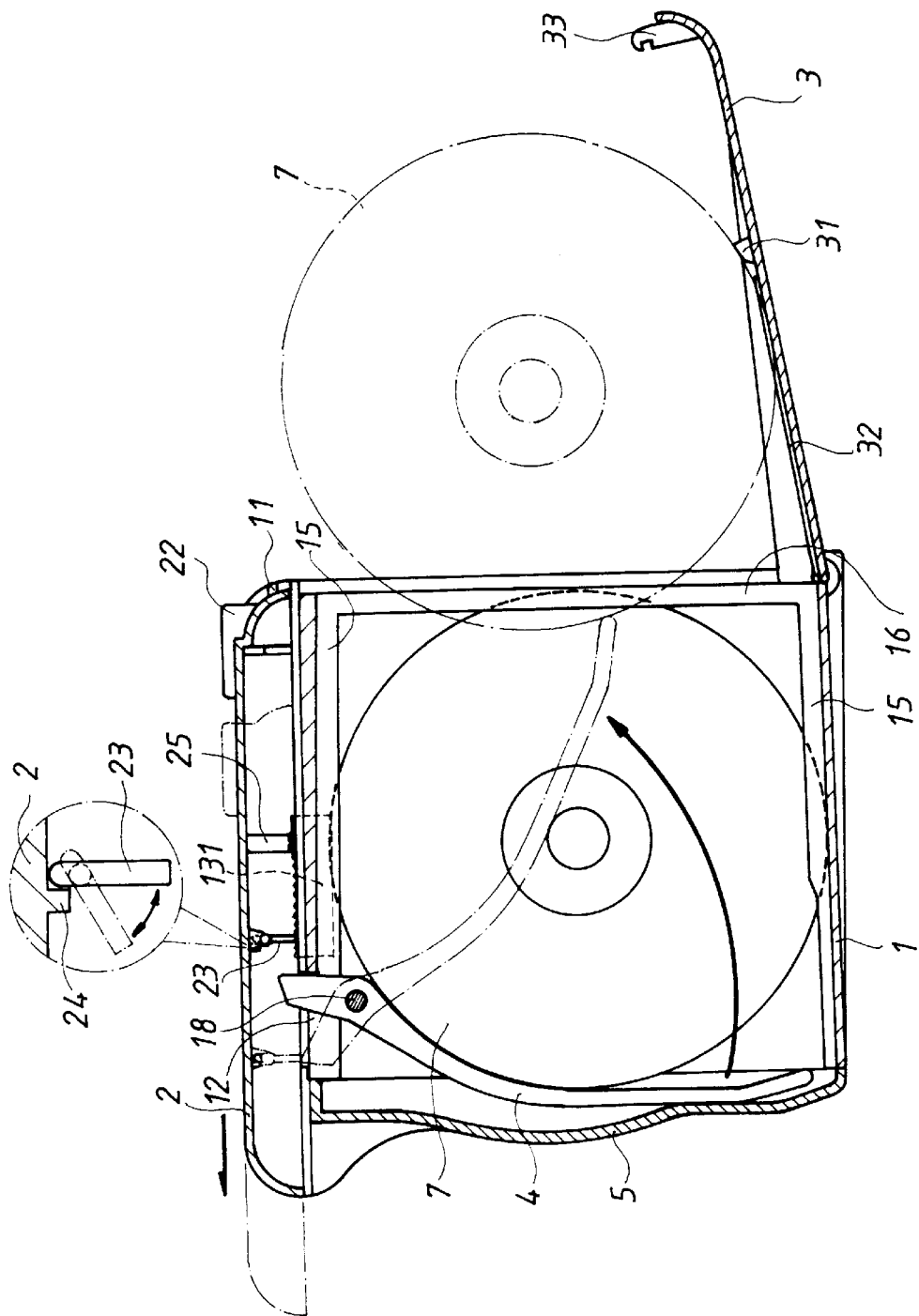
FIG. 5 is a cross sectional view schematically indicating the movements of the push rod of the invention when a compact disk is pushed outwardly.

Besides, in the exemplified embodiment, there are two sets of one-way stoppers 23 formed on the bottom face of the push plate 2. However, it is not a limitation to the invention. A single set or three or, more sets of one-way stoppers 23 are also allowable. Also, the one-way stopper 23 as shown in FIG. 5 is rotatably attached to the bottom of the push plate 2 and vertically hangs up there. When the push plate 2 is moved backwards, the protrusions 24 formed on the bottom face of the push plate 2 press against the upper end of one-way stoppers 23. Thus the lower end of stoppers 23 will urge push rods 4 to move. On the contrary, when the push plate 2 is moved forwards to its original position, there is no barrier to the rotation of stoppers 23. Hence the stoppers 23 will overturn to let the upper end of the push rods 4 pass through.

Figure 6:
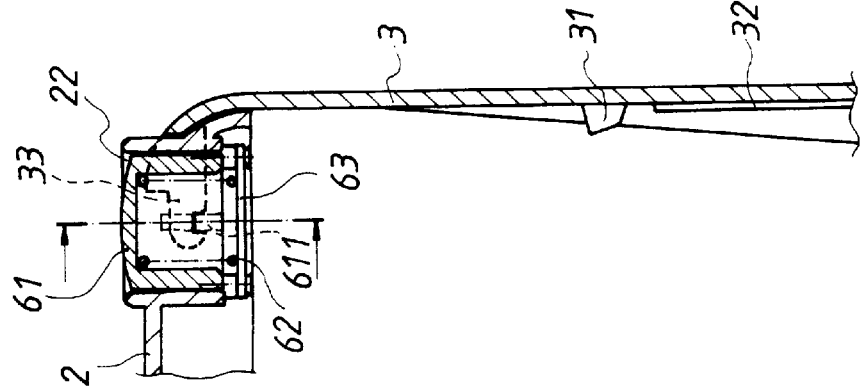
FIG. 6 is a detailed cross sectional view depicting the movements of a ratchet mechanism consisting of a ratchet bar and a stopper block.

In addition, as shown in FIG. 6, the ratchet bar 131 disposed in the groove 13 according to the invention and the detent block 25 of the push plate 2 are designed to give click sounds when moving the push plate 2 to advance compact disks. A resilient element 132 disposed under the ratchet bar 131 upwardly pushes the ratchet bar so that the ratchet bar 131 is kept in touch with the bottom of the detent block 25. When the push plate 2 moves, the contact between the ratchet bar 131 and the detent block 25 produces click sounds. Therefore, users can sense the displacement of the compact disks 7 in the box body 1.

Figure 7:
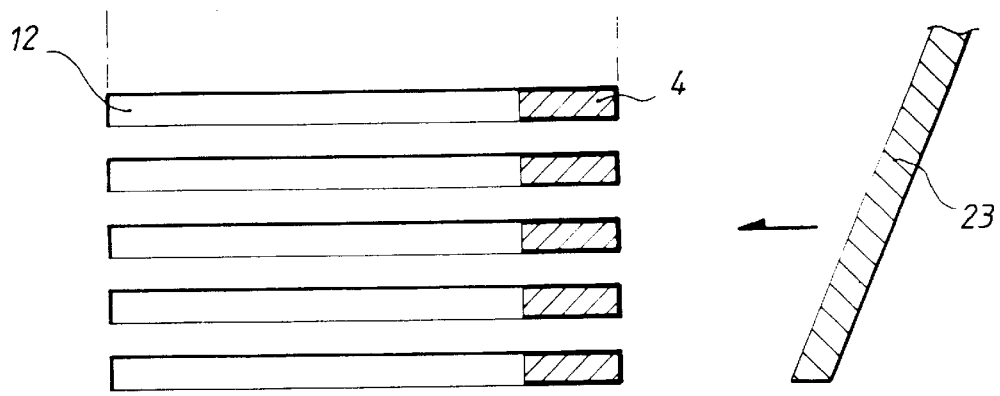
FIGS. 7 to 9 are partial cross sectional views showing progressive movements of push rods urged by a one-way stopper formed on the push plate according to the present invention.
Figure 8:
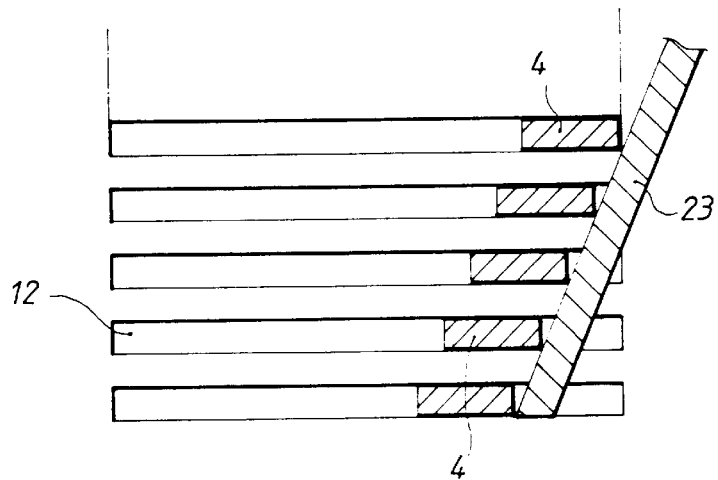
Figure 9:
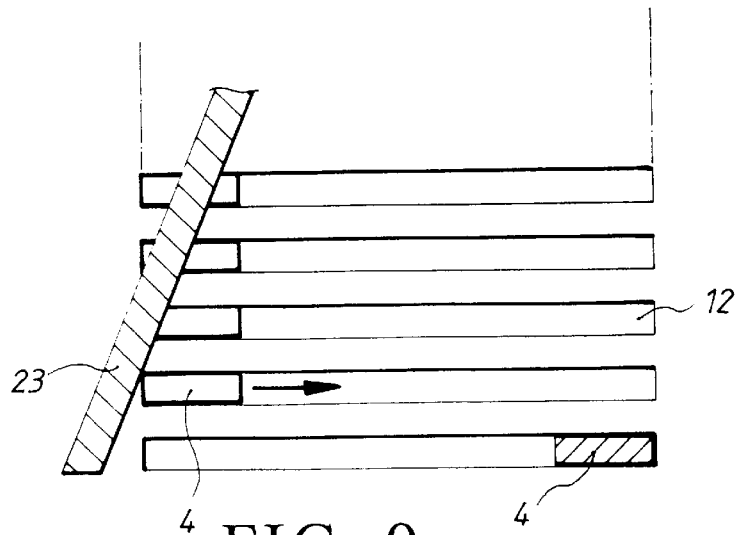

As can be seen from FIGS. 7, 8, and 9, the compact disk box above-mentioned is operated as follows.

(1) First depress the push button 6 to lower the wings 611, which releases the retention of the hook-shaped tabs and allows the front lid 3 to turn forwards and stay in a slight risen inclination.

(2) Then move the push plate 2 toward the rear end of the box to bring the one-way stoppers 23 formed on the bottom face thereof to displace. The one-way stoppers 23 will press against the upper end of the push rods 4 projecting out of the elongated openings 12 of the box body 1.

(3) The one-way stoppers 23 are arranged in an oblique degree relative to the push rods. Therefore, the motion of the stoppers 23 brings push rods 4 to displace in sequence.

(4) After that, the push rods 4 urge the compact disks 7 forwards. The compact disks 7 rolls forwards along the rails 32 on the front lid 3 until they are stopped by the tabs 31.

(5) As the one-way stoppers 23 of the push plate 2 pass through the push rods 4, gravity brings the push rods 4 to turn around the axle rod 18 and finally go back to their initial state. As a result the compact disks 7 are set free to move. The compact disks 7 automatically move back to the interior of the box 1 due to the slight risen front lid 3.

What the invention claimed is:

1. A compact disk box structure capable of automatically extending compact disks mainly comprising a compact disk box body, a push plate, a front lid, a plurality of push rods, and a back lid and completed with a switch mechanism; in which said box body has an open rear end and is provided with slide guide grooves on two sides of the top face thereof, a row of parallel elongated openings on the rear portion of the top face, a longitudinal groove on the central portion of the top face and extending from the front end to the rear end, a row of spaced partition ribs formed on the inner wall surface of the top and the bottom of the box body, a row of long slots disposed on a front wall of the box body, two axle holes individually arranged on two side walls near the elongated slots to allow an axle rod to pass through; said push plate has a guide bar arranged on two sides thereof, a push button hole at the center of the front edge, one or more one-way stoppers transversely disposed on the central portion of the bottom face, a plurality of protrusions and a detent block; said front lid is provided with a plurality of rails, two hook-shaped tabs respectively disposed on a position near two ends of the front edge of the inner wall, and two short pins individually arranged on the outer walls near two ends of the lower edge; said push rod has a curved rod body with an axle hole on the upper end thereof; said back lid is provided with a plurality of embossed dots on two side walls; and characterized in that a plurality of said push rods are arranged in sequence in the elongated openings on the top face of the box body with an axle rod extending through the axle holes on the two side walls of the box body and the axle holes of the push rods so that each push rod is rotatably seated between two adjacent partition ribs of the box body and said front lid is pivoted to the front end wall of the box body and can freely turn to open or be secured in position by means of the switch mechanism and said back lid is attached to the rear end of the box body to close the rear end opening.

2. The compact disk box structure as claimed in claim 1, in which said switch mechanism consists of a push button in conjunction with a resilient element and a retaining plate, said push button having a winglike extension on two sides thereof with a notch formed on the outermost end of the winglike extension.

3. The compact disk box structure as claimed in claim 1, wherein a ratchet bar having a toothed top surface is provided in the longitudinal groove of the box body and a detent block is disposed on the central area of the bottom face of the push plate and characterized in that when moving the push plate said ratchet bar in conjunction with said detent block produces click sounds and advances compact disks in a series of discrete steps.

4. The compact disk box structure as claimed in claim 3, wherein disposed under said ratchet bar is a resilient element that presses against the ratchet bar to keep it rising.

5. The compact disk box structure as claimed in claim 1, wherein said push plate has one or more sets of vertically downward extending one-way stoppers on the bottom face thereof.

6. The compact disk box structure as claimed in claim 1, wherein said box body has a plurality of cavities arranged on the two side walls near the rear end thereof.

7. The compact disk box structure as claimed in claim 1, wherein the inner wall face of said front lid is provided with a plurality of tabs on positions corresponding to said rails.

* * * * *